United States Patent [19]

Goshima

[11] 4,032,927

[45] June 28, 1977

[54] HIGH DENSITY OPTICAL RECORDING APPARATUS

[75] Inventor: Takeshi Goshima, Tokyo, Japan

[73] Assignee: Canon Kabushiki Kaisha, Tokyo, Japan

[22] Filed: Oct. 24, 1974

[21] Appl. No.: 517,763

Related U.S. Application Data

[63] Continuation of Ser. No. 359,627, May 14, 1973, abandoned.

[30] Foreign Application Priority Data

May 19, 1972  Japan .............................. 47-49688
May 22, 1972  Japan .............................. 47-51092

[52] U.S. Cl. .............................. 346/108; 350/255; 356/106 R
[51] Int. Cl.$^2$ ....................................... G01D 18/00
[58] Field of Search .......... 346/108, 76 L; 350/255; 356/106 R, 108, 109, 110, 124, 125, 126

[56] References Cited

UNITED STATES PATENTS

| | | | |
|---|---|---|---|
| 3,081,682 | 3/1963 | Khoury | 350/255 |
| 3,506,361 | 4/1970 | Erickson | 356/106 R |
| 3,511,149 | 5/1970 | Blattner et al. | 354/4 |
| 3,614,456 | 10/1971 | Hamisch | 356/125 |
| 3,716,845 | 2/1973 | Chaffin | 340/173 LM |
| 3,905,703 | 9/1975 | Matsumoto | 356/106 R |

OTHER PUBLICATIONS

Max, E., Measuring of Distance Between Head and Disk, IBM Tech. Disc. Bulletin, vol. 12, No. 11, Apr. 1970, p. 1750.

Primary Examiner—Joseph W. Hartary

[57] ABSTRACT

A high density optical recording apparatus provided with a light sensitive member adapted to make concave and convex records in response to beams. A recording medium is placed on the disc and a shaft axially secured to the disc is rotated by means of a motor to turn the recording medium together with the disc. An interference optical system is provided to strictly maintain the relative position between the recording optical system and the recording medium. A floating body provided with a plurality of floaters is adapted to be floated by an air flow generated when the recording medium is turned.

6 Claims, 4 Drawing Figures

HIGH DENSITY OPTICAL RECORDING APPARATUS

This is a continuation of application Ser. No. 359,627, filed May 14, 1973 for "High Density Optical Recording Apparatus", now abandoned.

BACKGROUND OF THE INVENTION

1. Field of the Invention

This invention relates generally to the field of optical recording apparatus and specifically to a high density optical recording apparatus adapted to provide a stabilized recording on a recording medium.

2. Description of the Prior Art

It is well-known that optical methods have been utilized as extremely effective methods for recording information of high density and for recording video signals.

However, in prosecution of optical recording as described above, it is required to have less than approximately $0.3\mu$ of allowable clearance in positional relationship between the recording portion of the recording medium, which is formed in a drum, belt or disc and travels with respect to a recording optical sytem, and the recording optical system. In case the optical system secured with respect to the recording medium with conventional working accuracy is used, however, it is extremely difficult to maintain the relative position between the recording portion of the travelling recording medium and the recording optical system within such a small range of allowance as described above. Further, it is not easy to make sure that the recording medium is properly positioned with respect to the recording optical system, and to adjust the focus of the recording light.

In prosecution of optical recording, it is conventional to employ a floater adapted to be floated by fluid pressure generated between the recording optical system and the travelling recording medium, said floater being floated adjacent to said recording medium to thereby provide a method for maintaining the relative position within the range of allowance. Such a floating method and floating means are well-known as shown in, for example, IBM Journal Vol. 3, Nos. 3 (1959) pages 237 through 274, "A GAS FILM LUBRICATION STUDY". However, in maintaining the relative position by way of a single floater, when the whole mass and inertial movement are great and inclination is produced in an optical axis due to the undulation and the like formed on the surface of the recording medium, resistivity against it is not sufficient so that vibrations are continuously generated to thus produce an error in recording position and focus. Further, if the recording medium is specifically formed in a rotating disc, and when the recording optical system is moved in a radial direction, a travelling speed of the recording medium relative to the recording optical system is different depending upon the position in the radial direction so that the floating force of said floater is varied accordingly, thus it is difficult to maintain the relative position between the recording medium and the recording optical system.

Moreover, in case the recording optical system is floated merely by the single floater, there are many problems existed such as excessively great floating force, unstable floating space, accuracy in manufacture, and the like.

SUMMARY OF THE INVENTION

It is therefore an object of this invention to provide a high density optical recording apparatus adapted to make a stabilized recording on a recording medium.

It is a further object of this invention to provide a high density optical recording apparatus which is able to accurately make sure that the recording optical system is properly positioned with respect to the recording medium.

It is another object of this invention to provide a high density optical recording apparatus in which the relative position between the recording medium and the recording optical system can easily be adjusted within the allowable range.

It is yet another object of this invention to provide a high density optical recording apparatus in which the relative position between the recording medium and the recording optical system can easily be adjusted for its increase and decrease.

It is still another object of this invention to provide a high density optical recording apparatus in which the relative position between the recording medium and the recording optical system can automatically be adjusted.

Other objects and features of the invention will be more clearly understood in the following description with reference to the accompanying drawings.

DESCRIPTION OF THE PREFERRED EMBODIMENTS

Figure 1:
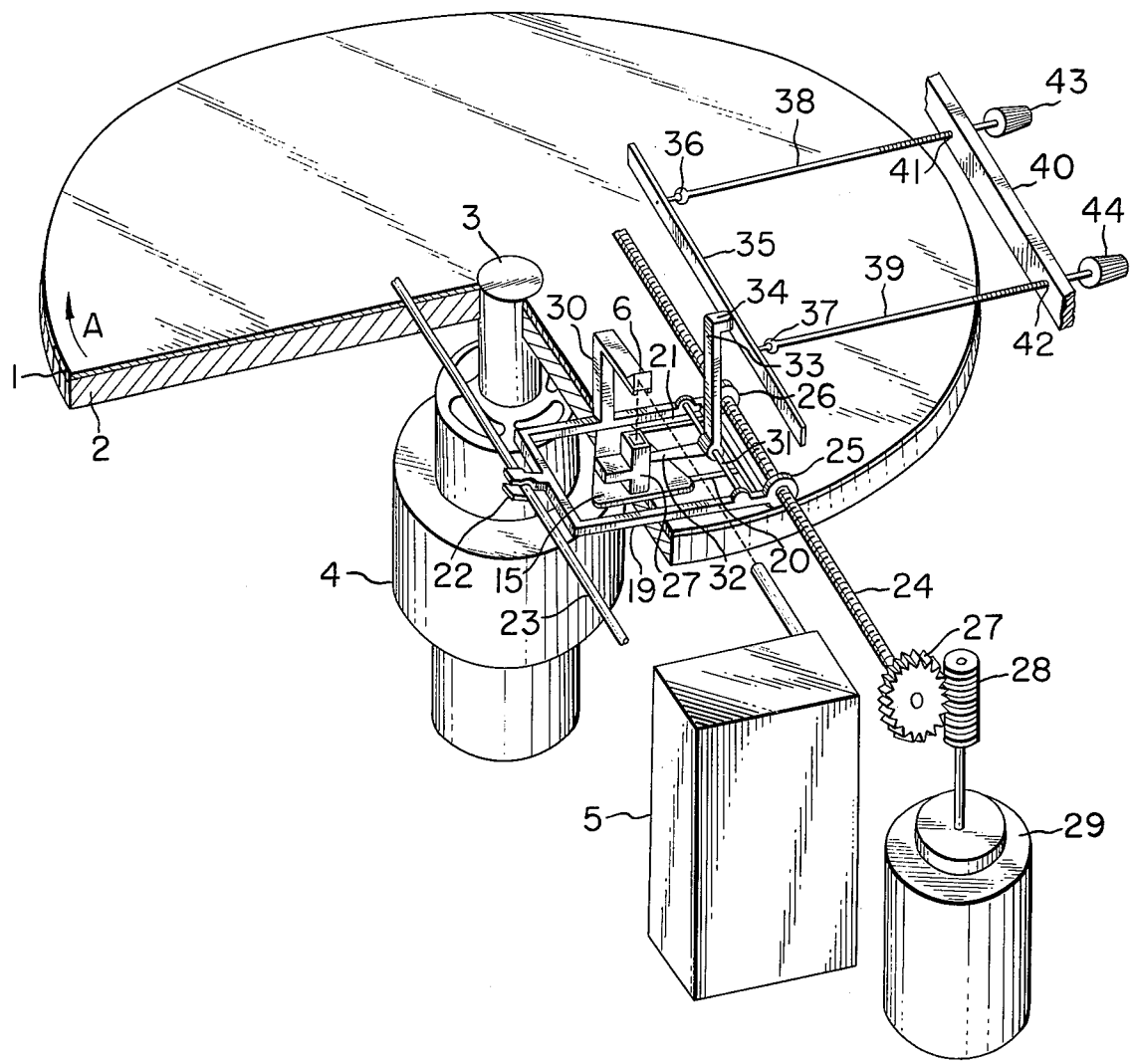
FIG. 1 is a schematic perspective view, partly broken away, to show one embodiment of a high density optical recording apparatus of the present invention.
Figure 2:
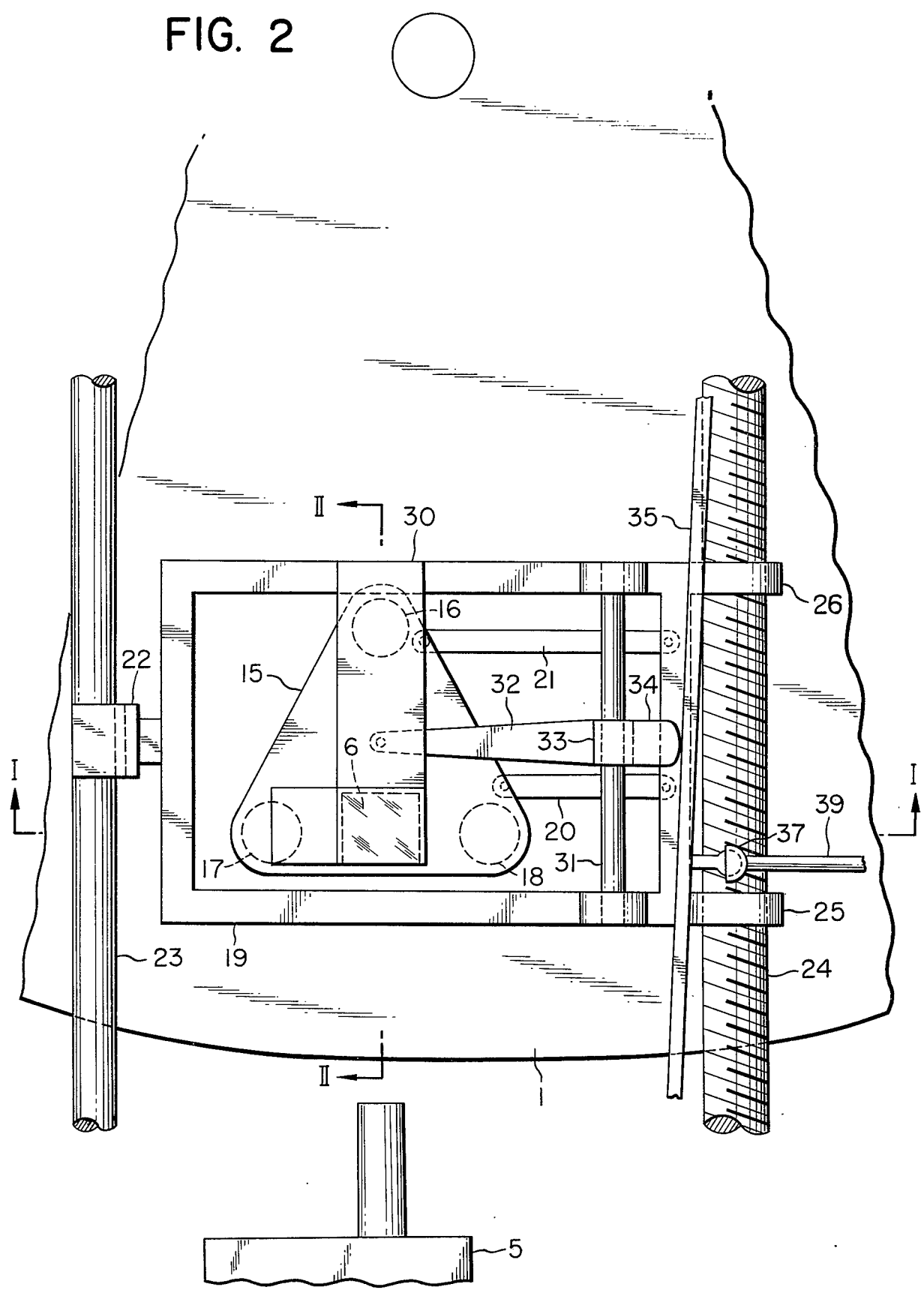
FIG. 2 is a partial plan view of the high density optical recording apparatus shown in FIG. 1 of the present invention.

The invention will now be described with reference to the accompanying drawings which illustrate an embodiment of a high density optical recording apparatus disclosed according to this invention.

The apparatus according to this invention includes a light sensitive member adapted to obtain concave and convex records on a surface by means of beams such as laser beams, in which a recording medium 1 is placed on a disc 2, said recording medium being capable of writing signals by the recording beam such as laser modulated in accordance with signals such as recording signal and video signal as desired, and a shaft 3 axially secured to said disc 2 is rotated by means of a driving motor 4 to thereby turn said recording medium 1 in a direction as indicated by the arrow A together with said disc 2 at a constant speed so that optical writing-in by the recording beam may be effected on said recording medium 1. Said recording beam emerges from a recording beam generator, which modulates the laser beam in accordance with the recording signal or video signal, and is reflected from a prism 6 and is then incident upon an optical system 7 including an interference optical system 8 and a recording optical system 9. The recording beam reflected from the prism 6 is incident upon the interference optical system 8 with a half mirror 10 formed therein, and a part of the recording beam is reflected by said half mirror 10 to the right in FIG. 3 while the other part thereof further goes straight ahead and is incident upon a recording optical system 9 comprising lens and the like to make a record bringing to a focus on the recording medium 1. The interference optical system 8 is provided in order to make sure of such facts that the focus is determined in accordance with the distance between the recording optical system 9 and the recording medium 1 and that the relative position thereof should strictly be maintained.

The interference optical system 8 will now be described. The recording beam with the focus brought on said recording medium 1 through said recording optical system 9 will have part of its energy consumed for recording while the other part thereof is reflected. If the beam concentrates on the surface of the recording medium or the near-by reflection surface, this reflected beam is incident upon the interference optical system 8 again as a parallel beam via said recording optical system 9, and if the recording beam does not concentrate on the surface of the recording medium or the near-by reflection surface, said reflected beam is incident upon the interference optical system 8 as a spherical beam via said recording optical system 9, and a part thereof is reflected from the half mirror 10 to the left in FIG. 3. This beam is called a first beam. The interference optical system 8 has its one side, the right side in FIG. 3, vaporised with a thin metal film to form a reflection layer 11, and a part of the beam reflected from the half mirror 10 out of the recording beam incident upon the interference optical system 8 from the prism 6 is reflected from said reflection layer 11 and said part of the beam is again reflected from the half mirror 10 upon the prism 6, though a majority portion of the beam passes through said half mirror 10. This beam passed therethrough is called a second beam. In said interference optical system 8, the first and second beams emerged from the half mirror 10 and interfere with one another and said interference wave beams emerge from one side of said interference optical system, i.e. to the left side in FIG. 3, and are enlarged through expander lens systems 12, 13 to project the interference pattern on a translucent screen 14. If both the first and second beams are parallel the light and the length of light path in which the beams are divided by the half mirror 10, are reflected beyond respective light paths and meet one another again at the half mirror 10 does not vary by time, the interference pattern on the translucent screen 14 does not vary, but if the light appeared on the recording medium 1 from the recording optical system 9 does not focus on said recording medium, that is, if the first beam becomes the spherical wave, the interference pattern on the screen 14 varies its pattern. This one enables to confirm the relative position between said recording optical system 9 and the recording medium 1 and to confirm the focus. In order to maintain the given relative position of said recording optical system 9 with respect to the recording medium 1, an optical system 7 including the interference optical system 8 and the recording optical system 9 is placed on a floating body 15 adapted to be floated in a fine spaced relationship with respect said recording medium 1 by an air flow produced when said recording medium 1 is turned. Further, said floating body 15 is provided thereunder, in spaced relation, with a plurality of floaters, for example, three floaters 16, 17, 18 so as to secure a constant floating force and stability, said floaters 16, 17, 18 serving to obtain the floating force. Further, the floating force of said floaters 16, 17, 18 are greatly influenced by their shapes and are determined by a speed relative to the recording medium 1, so that in such a case, in which there is produced a difference in speeds between the outer periphery and the inner periphery of the rotating disc-like recording medium 1 as seen in the present embodiment, it is necessary to suitably determine the arrangement of the floaters and the position in which the optical system is placed and to individually change the shapes of said floaters for obtaining optimum stablized shapes. Said floating body is vertically movably connected to a base body 19 through thin plate-like leaf springs 20, 21 having the resilience in a vertical direction. Said base body 19 has one end slidably supported by a guide bar 23 secured to means not shown through a sliding support pawl 22, and has its other end supported by means of a feed screw member 24 supported by means not shown and having threads in its outer periphery through feed supporting members 25, 26 engageable with the thread of said member 24. Said feed screw member 24 has one end axially provided with a gear 27 which is driven by a motor 29 through a worm gear 28, and the rotation of said gear causes the feed screw member 24 to rotate and to thereby move the base body 19 supported by the feed supporting members 25, 26 in a radial direction of the disc-like recording medium 1, i.e. towards inner periphery or outer peripheral. Further, as said base body 19 moves, both floating body 15, connected to said base body 19 through leaf springs 20, 21, and optical system 7, placed thereon, move in a radial direction, but the guide bar 23 and the feed screw member 24 must be arranged so that the recording position on the recording medium 1 focussed with recording beams by the recording optical system 9 may be accurately moved. Further, the purpose of moving the recording optical system in a radial direction is to make a spiral or concentric record on the recording medium. The prism 6 is supported by a supporting lever 30 mounted on the base body 19 and arranged so that the beams incident in parallel, with the radial direction of the rotating recording medium 1, are incident upon the optical system 7, and it is so arranged that the recording beams energizing from the recording beam generator 5 are always incident upon said prism 6 in parallel with the radial direction of the recording medium 1, whereby the recording beams are accurately the incident upon the optical system 7 irrespective of the position of said optical system 7 in a radial direction of the recording medium.

Since the floating force of the floating body 15 is determined by the relative speed with respect to the rotating recording medium 1, said floating force varies in accordance with the position in the radial direction of the floating body 15. Namely, the relative speed gains towards the outer periphery of the recording medium 1 while it loses towards the inner periphery thereof so that the floating force of the floating body 15 tends to be increased towards the outer periphery of the recording medium. In order to maintain a constant relative position between the recording medium 1 and the recording optical system 9 irrespective of position of the floating boy 15 in the radial direction in such conditions as described above, it is necessary to variably control the floating force in accordance with the position of the floating body in the radial direction. To this end, a means is provided for automatically controlling the floating force.

Figure 3:
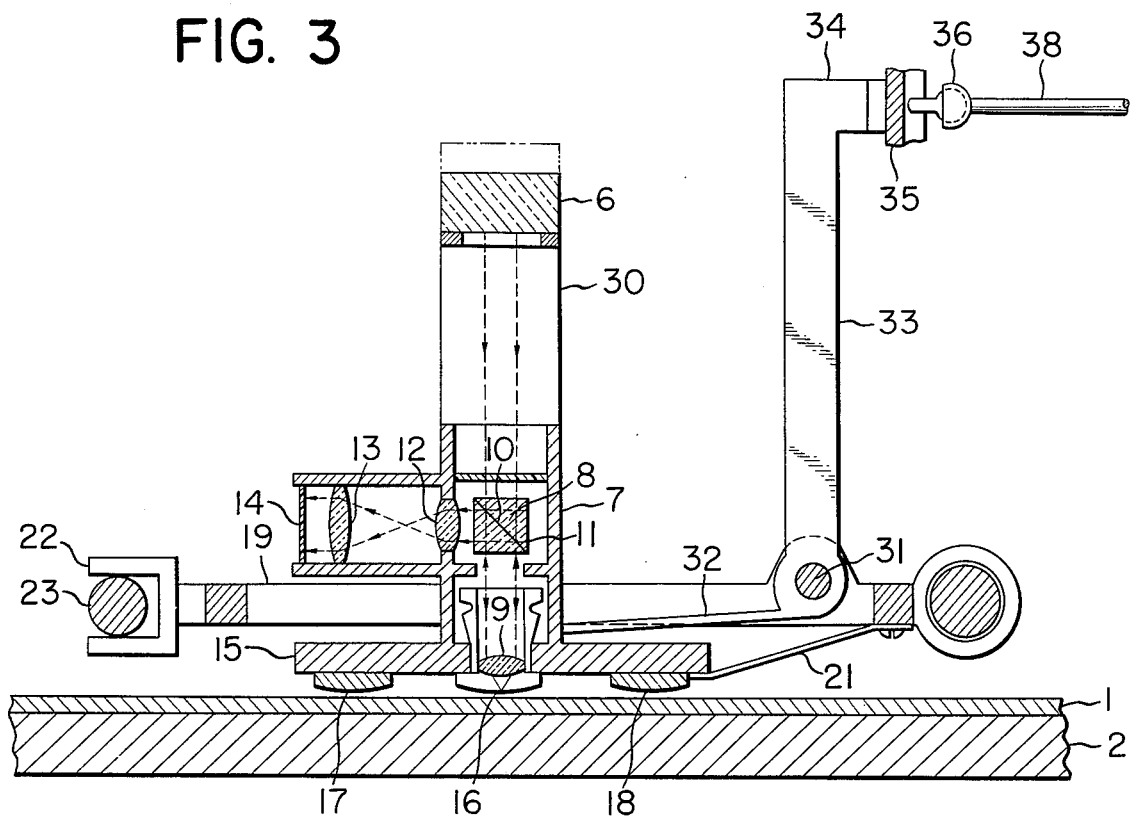
FIG. 3 is a partial sectional view taken on line I—I of FIG. 2.
Figure 4:
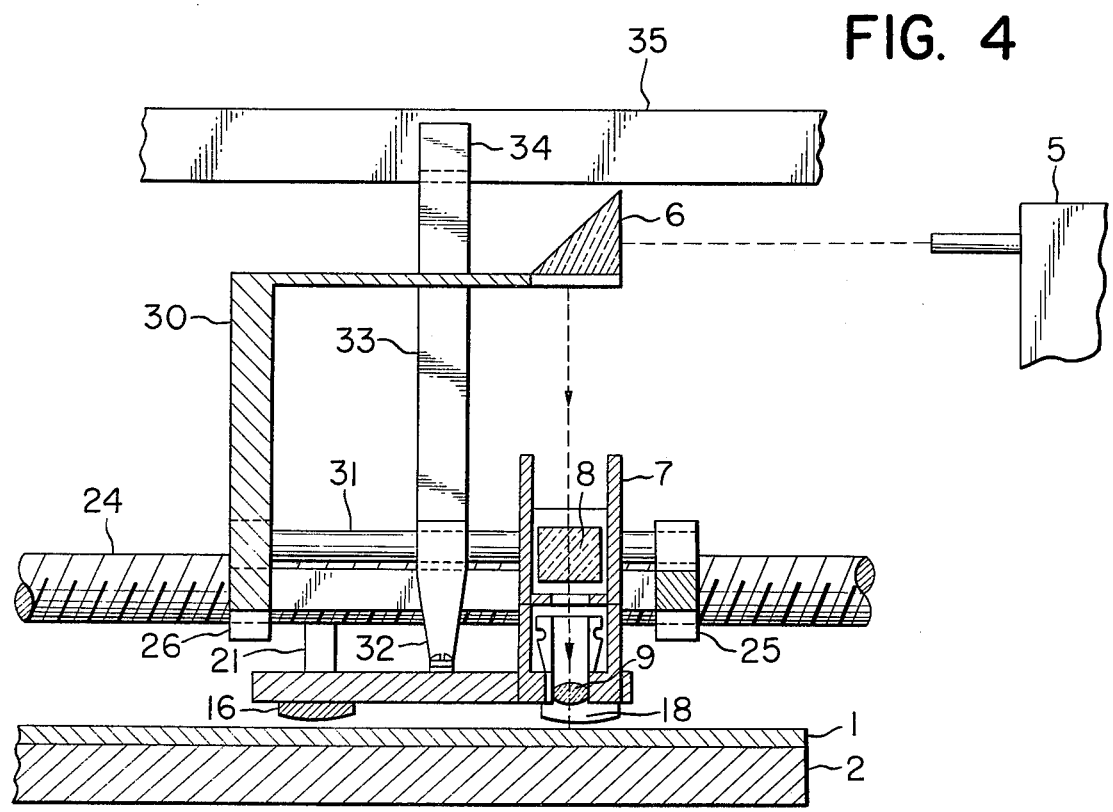
FIG. 4 is a partial sectional view taken on line II—II of FIG. 2.

Means for controlling the floating force will now be described. A slight downward pressing force is applied on the center of the floating force of the floating body 15 by means of a leaf spring 32 rotatably mounted on a shaft 31 mounted on the base body 19, said pressing force being determined by the rocking of a lever 33 similarly slidably mounted on the shaft 31 and secured to said leaf spring 32. Lever 33 has one end provided with a sliding member 34, which is disposed in slidable contact with a sliding guide plate 35 mounted in parallel with the recording medium 1 and having a given inclination with respect to the moving direction of said floating body 15 in the radial direction, and the degree of rocking of said lever 33, that is, the controlling force of the floating force of the floating body 15 by the leaf spring 32 is determined by said sliding guide plate 35. Namely, when the lever 33 is rocked in a clockwise direction as shown in FIG. 3, the pressing force of the floating body 15 by the leaf spring 32 decreases, while when it is rocked in a counterclockwise direction, the pressing force of the floating body 15 by the leaf spring 32 increases. Accordingly, the inclination of said sliding guide plate 35 should be so determined that when the floating body 15 is on the outer peripheral side of the recording medium, the floating force of the floating body is strongly controlled while when it is in the inner peripheral side thereof, the floating force is feebly controlled, whereby it is necessary to incline the outer peripheral side towards said sliding member 34 and to incline the inner peripheral side opposite to that of said sliding member 34. The degree of this inclination should be so determined that even if the floating force of the floating body 15 is in the inner peripheral side of the recording medium 1 or in the outer peripheral side thereof, the relative position between the recording optical system 9 and the recording medium 1 is made constant. As the case may be, said sliding guide plate 35 can be replaced by one having a given curve instead being of linear. Further, the inclination of the sliding guide plate 35 can be adjusted by adjusting rods 38, 39 coupled to said guide plate 35 through universal joints 36, 37. These adjusting rods 38, 39 are supported by a base plate 40 secured to means not shown and have threads on the outer periphery thereof, said threads being engaged with tapped holes 41, 42, respectively, made in said base plate 40, and the adjusting rods 38, 39 are moved in their axial directions by turning knobs 43, 44 mounted on one end of the adjusting rods 38, 39 so that the inclination of said sliding guide plate 40 may be easily adjusted. Further, adjusting the focus of the beams focussed on the recording medium 1 from the recording optical system 9 may be made not only by adjustment of optical systems but by adjustment of the relative position between said recording optical system 9 and the recording medium 1 so that the focus may also be adjusted by adjusting the floating force of the floating body 15 through operation of said knobs 43, 44. In general, adjustment of the focus in the recording optical system is carried out by directly applying a turning force to the bodytube of the lens. However, in case the recording optical system 9 is placed on the precise floating body 15 as described above, the method of directly applying the turning force can not be said to be preferable, and judging from this point of view, the aforementioned method would be extremely effective.

Although the leaf springs and the sliding guide plate mounted with inclination are utilized, in the above embodiment, for controlling the floating force of the floating body, the floating force can also be adjusted by means of an electric current making use of an electromagnetic force. In this case, current controlling means such as electromagnetic force can be used in place of the spring for controlling the floating force and the sliding resistance can be used in place of the sliding guide plate.

Furthermore, the aforesaid means for controlling the floating force is not limited in use for the floating body 15, but is provided, in the case where extreme unbalance in the floating force is produced, so that different adjustments may be made with respect to individual floaters.

According to the high density optical recording apparatus as constructed as described above, the relative position between the recording optical system and the recording medium can easily be made of by the employment of the interference optical system. In addition, in such a construction, wherein recording is carried out with the recording beams completely focussed on the recording medium, and the recording beam prior to writing-in and the recording beam reflected from the recording medium are interferred one with respect to another in the interference optical system to form an interference wave, the focus can easily and accurately be adjusted by observing said interference wave. Further, in order to maintain a distance of several $\mu$ with respect to the recording medium, travelling in the recording optical system, an extremely accurate method is provided, in which the recording optical system is placed on the floating body which is floated on the recording medium by utilization of the air flow generated by its travel on said recording medium so that said floating body follows the undulation and flexure of the recording medium. In this case, it is possible to control the variation of space caused by the undulation and flexure of the recording medium to an extemely fine degree.

Further, a floating body having an extremely good stability with respect to the variation of inclination, or the like, can be obtained by the provision of a plurality of floaters, in spaced relation, to float the floating body.

As previously mentioned, the high density optical recording apparatus can provide a record having extremely good stability.

While a preferred embodiment of the invention has been described in detail to some extent, it is to be understood that various changes with respect to combination and arrangement of parts may be made without departing from the spirit or scope of the following claims.

I claim:

1. A high density optical recording apparatus comprising:
   a recording medium having a light sensitive member on which recording is effected by sensing a beam;
   means for producing a coherent beam modulated in accordance with a recording signal to be recorded on said recording medium;
   beam splitter means disposed across an optical path of the coherent beam, said beam splitter means dividing the coherent beam into a first beam and a second beam;

an optical lens system for focusing the first beam onto said recording medium to optically write the recording signal in said recording medium;

interference optical means for measuring the clearance between said optical lens system and a surface of said recording medium by an interference fringe pattern, said interference optical means including; optical means for directing at least one of said beams, to wit, the second beam and the first beam which has been reflected by said recording medium and is inverted through said optical lens systems, in such a direction that the two beams are coherent, and a screen for forming an interference fringe pattern by said two beams; and floating means carrying at least a portion of said optical lens system and said interference optical means, wherein said floating means includes three floating members, and wherein at least one of said floating members floats above the surface of said recording medium by virtue of high air pressure produced at a side of the floating member opposed to the recording medium.

2. A high denity optical recording apparatus comprising:

a recording medium having a light sensitive member on which recording is effected by sensing a beam;

means for producing coherent beam modulated in accordance with a recording signal to be recorded on said recording medium;

beam splitter means disposed across an optical path of the coherent beam, said beam splitter means dividing the coherent beam into a first beam and a second beam;

an optical lens system for focusing the first beam onto said recording medium to optically write the recording signal in said recording medium;

interference optical means for measuring the clearance between said optical lens system and a surface of said recording medium by an interference fringe pattern, said interference optical means including; optical means for directing at least one of said beams, to wit, the second beam and the first beam which has been reflected by said recording medium and is inverted through said optical lens systems, in such a direction that the two beams are coherent, and a screen for forming an interference fringe pattern by said two beams;

floating means carrying at least a portion of said optical lens system and said interference optical means, and having at least one floating member which floats above the surface of said recording medium by virtue of high air pressure produced at a side of the floating member opposed to the recording medium; and means for controlling the clearance between said optical lens means and the surface of said recording medium, said controlling means applying an urging force to said floating means in a direction for said recording medium to regulate the floating force provided by said floating means.

3. A high density optical recording apparatus comprising:

a disk-shaped recording medium having a light sensitive member on which recording is effected by sensing a beam;

means for rotating said recording medium;

means for producing a coherent beam modulated in accordance with a recording signal to be recorded on said recording medium;

beam splitter means disposed across an optical path of the coherent beam, said beam splitter means dividing the coherent beam into a first beam and a second beam;

an optical lens system for focusing the first beam onto said recording medium to optically write the recording signal on said recording medium;

interference optical means for measuring the clearance between said optical lens system and a surface of said recording medium by an interference fringe pattern, said interference optical means including, optical means for directing at least one of said beams, to wit, the second beam and the first beam which has been reflected by said recording medium and is inverted through said optical lens system, in such a direction that the two beams are coherent; a screen for forming an interference fringe pattern by said two beams; and floating means carrying at least a portion of said optical lens system and said interference optical means, and having at least one floating member which floats above the surface of said recording medium by virtue of a high air pressure produced at a side of the floating member opposed to said recording medium;

means for radially moving said floating means above the surface of said disk-shaped recording medium; and controlling means for maintaining a constant clearance between said optical lens means and the surface of said recording medium, said controlling means applying an urging force to said floating means in a direction toward said recording medium in accordance with the radial position of said floating means so that the urging force becomes greater as the floating means moves further from the center of the disk-shaped recording medium.

4. A high density optical recording apparatus comprising:

a disk-shaped recording medium having a light sensitive member on which recording is effected by sensing a beam;

means for rotating said recording medium;

means for producing a coherent beam modulated in accordance with a recording signal to be recorded on said recording medium;

beam splitter means disposed across an optical path of the coherent beam, said beam splitter means dividing the coherent beam into a first beam and a second beam;

an optical lens system for focusing the first beam onto said recording medium to optically write the recording signal on said recording medium;

interference optical means for measuring the clearance between said optical lens system and a surface of said recording medium by an interference fringe pattern, said interference optical means including, optical means for directing at least one of said beams, to wit, the second beam and the first beam which has been reflected by said recording medium and is inverted through said optical lens system, in such a direction that the two beams are coherent; a screen for forming an interference fringe pattern by said two beams; and floating means carrying at least a portion of said beam splitter means, said optical lens system and said interference optical means, and having at least one floating member which floats above the surface of said recording medium by virtue of a high air pressure produced at a side of the floating member opposed to said recording medium; and means for radially moving said floating means above the surface of said disk-shaped recording medium.

5. A high density optical recording apparatus comprising:

a disk-shaped recording medium having a light sensitive member on which recording is effected by sensing a beam;

means for rotating said recording medium;

means for producing a coherent beam modulated in accordance with a recording signal to be recorded on said recording medium;

beam splitter means disposed across an optical path of the coherent beam, said beam splitter means dividing the coherent beam into a first beam and a second beam;

an optical lens system for focusing the first beam onto said recording medium to optically write the recording signal in said recording medium;

interference optical means for measuring the clearance between said optical lens system and a surface of said recording medium by an interference fringe pattern, said interference optical means including: optical means for directing at least one of said beams, to wit, the second beam and the first beam which has been reflected by said recording medium and is inverted through said optical lens system, in such a direction that the two beams are coherent; a screen for forming an interference fringe pattern by said two beams; and floating means carrying at least a portion of said optical lens system, said interference optical means and said beam splitter means, said floating means having at least one floating member which floats above the surface of said recording medium by virtue of a high air pressure produced at a side of the floating member opposite to said recording medium, said air pressure being produced, during the rotation of said recording medium, with the aid of at least one surface of the floating member being nonparallel to the surface of said recording medium; and means for radially moving said floating means above the surface of said disk-shaped recording medium.

6. A high density optical recording apparatus comprising:

a disk-shaped recording medium having a light sensitive member on which recording is effected by sensing a beam;

means for rotating said recording medium;

means for producing a coherent beam modulated in accordance with a recording signal to be recorded on said recording medium;

beam splitter means disposed across an optical path of the coherent beam, said beam splitter means dividing the coherent beam into a first beam and a second beam;

an optical lens system for focusing the first beam onto said recording medium to optically write the recording signal on said recording medium;

interference optical means for measuring the clearance between said optical lens systems and a surface of said recording medium by an interference fringe pattern, said interference optical means including, optical means for directing at least one of said beams, to wit, the second beam and the first beam which has been reflected by said recording medium and is inverted through said optical lens system, in such a direction that the two beams are coherent, and a screen for forming an interference fringe pattern by said two beams; and floating means carrying at least a portion of said optical lens system and said interference optical means, said floating means having at least one floating member which floats above the surface of said recording medium by virtue of a high air pressure produced at a side of the floating member opposed to said recording medium, said air pressure being produced, during the rotation of said recording medium, with the aid of at least one surface of the floating member being nonparallel to the surface of said recording medium;

means for radially moving said floating means above the surface of said disk-shaped recording medium; and means for maintaining a constant clearance between said optical lens means and the surface of said recording medium, said maintaining means applying an urging force to said floating means in a direction toward said recording medium in accordance with the radial position of said floating means so that the urging force becomes greater as the floating means moves further from the center of the disk-shaped recording medium.

* * * * *

UNITED STATES PATENT AND TRADEMARK OFFICE
CERTIFICATE OF CORRECTION

PATENT NO. : 4,032,927
DATED : June 28, 1977
INVENTOR(S) : TAKESHI GOSHIMA

It is certified that error appears in the above-identified patent and that said Letters Patent are hereby corrected as shown below:

Column 1, line 49, delete "movement" and insert --moment--.

Column 3, line 50, change "appeared" to read --appearing--.

line 55, change "one enables" to read --enables one--.

line 63, after "respect" insert --to--.

Column 4, line 12, change "stablized" to read --stabilized--.

line 29, change "peripheral" to read --periphery--.

line 45, change "energizing" to read --emerging--.

line 64, delete "boy" and insert --body--.

Column 6, line 21, after "made" insert --sure--.

Column 7, line 24, change "denity" to read --density--.

line 28, after "producing" insert --a--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*